(12) United States Patent
Hock

(10) Patent No.: US 7,713,051 B2
(45) Date of Patent: May 11, 2010

(54) APPARATUS FOR FORMING A PARISON

(76) Inventor: Mark R. Hock, 5503 Brixton Dr., Sylvania, OH (US) 43560

( * ) Notice: Subject to any disclaimer, the term of this patent is extended or adjusted under 35 U.S.C. 154(b) by 0 days.

(21) Appl. No.: 11/962,444

(22) Filed: Dec. 21, 2007

(65) Prior Publication Data

US 2008/0157443 A1    Jul. 3, 2008

Related U.S. Application Data

(60) Provisional application No. 60/878,593, filed on Jan. 3, 2007.

(51) Int. Cl.
*B29C 47/20* (2006.01)

(52) U.S. Cl. .................. 425/381; 425/532; 425/465; 425/466; 425/467

(58) Field of Classification Search .......... 425/381, 425/465, 466, 467, 532
See application file for complete search history.

(56) References Cited

U.S. PATENT DOCUMENTS

| | | | |
|---|---|---|---|
| 3,538,547 A * | 11/1970 | Drabb | 425/113 |
| 3,557,265 A | 1/1971 | Chisholm et al. | |
| 3,884,606 A | 5/1975 | Schrenk | |
| 4,152,104 A * | 5/1979 | Przytulla et al. | 425/462 |
| 4,548,569 A * | 10/1985 | Pitigliano et al. | 425/133.1 |
| 5,143,677 A * | 9/1992 | Blemberg et al. | 264/171.27 |
| 5,183,669 A * | 2/1993 | Guillemette | 425/113 |
| 5,202,074 A | 4/1993 | Schrenk et al. | |
| 5,206,032 A * | 4/1993 | Bock | 425/131.1 |
| 5,380,479 A | 1/1995 | Schrenk et al. | |
| 5,531,952 A * | 7/1996 | Hatfield | 264/171.26 |
| 5,540,878 A | 7/1996 | Schrenk et al. | |
| 5,628,950 A | 5/1997 | Schrenk et al. | |

* cited by examiner

*Primary Examiner*—Robert B Davis
*Assistant Examiner*—Joseph Leyson
(74) *Attorney, Agent, or Firm*—Marshall & Melhorn, LLC

(57) ABSTRACT

An apparatus for forming a parison is described. The apparatus has a mandrel housing. The housing has an axially aligned hollow mandrel channel therein and a side channel substantially transverse to the mandrel channel. A mandrel is also provided. The mandrel has an axially oriented notch in an exterior surface. The notch is in fluid communication with two fluid channels that extend continuously downwardly around the mandrel to meet one another on an opposite side of the mandrel from the notch. When the mandrel is installed within the mandrel channel, a first radial gap and a second radial gap, both between the mandrel and the mandrel housing, are formed.

1 Claim, 7 Drawing Sheets

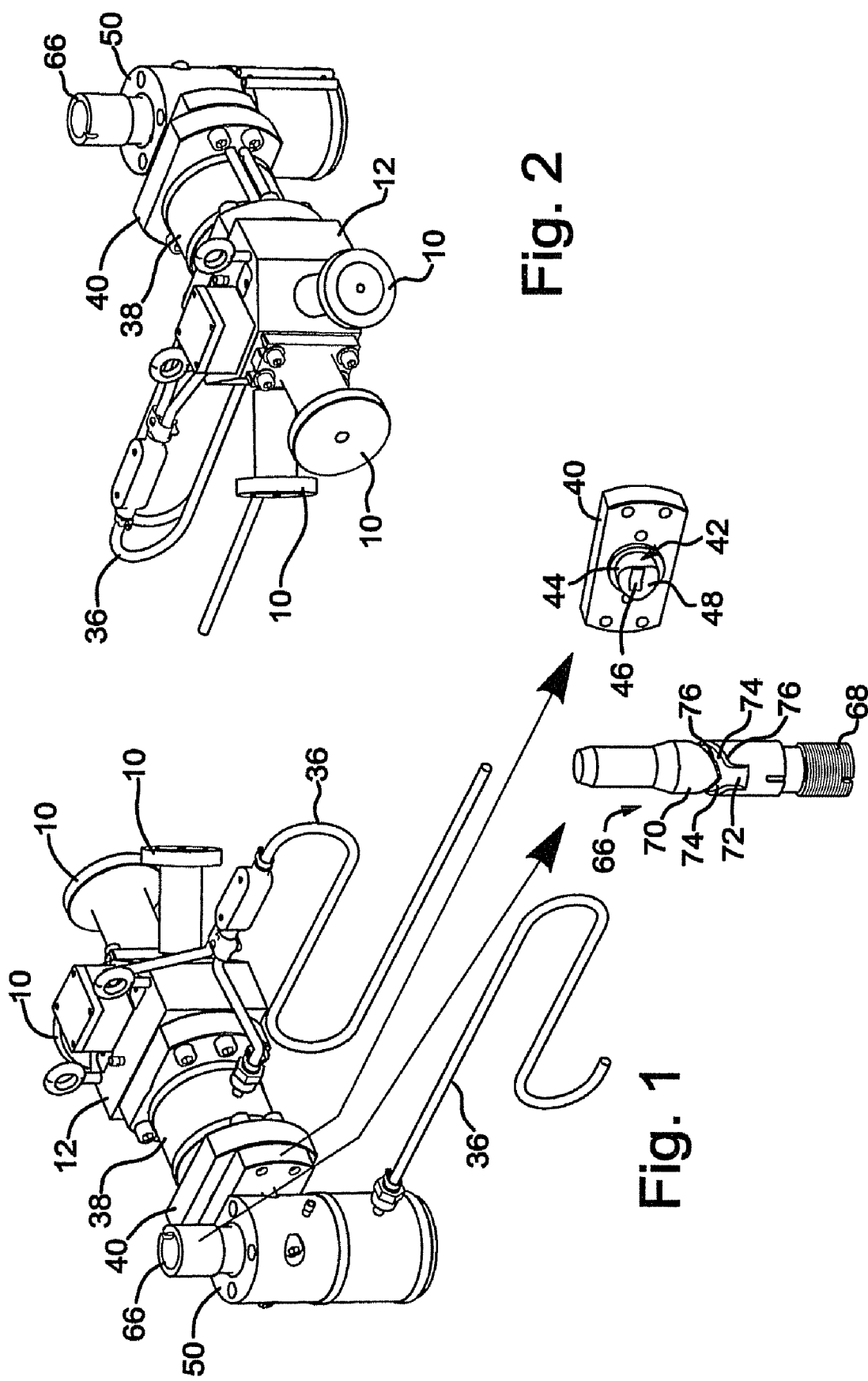

US 7,713,051 B2

APPARATUS FOR FORMING A PARISON

RELATED APPLICATIONS

This application claims the benefit, under 35 U.S.C. 119 (e), of U.S. patent application Ser. No. 60/878,593, filed on Jan. 3, 2007 under 35 U.S.C. 111 (b), which is incorporated in its entirety by reference.

FIELD OF THE INVENTION

The present invention relates to a method and apparatus for forming a parison.

BACKGROUND OF THE INVENTION

Current or standard practice for making a composite stream is that each material is given its own separate channel for polymer flow all the way through to a point just before the exit of material from the head. One departure of the device disclosed herein from the prior art is that the composite stream is fully formed before the material even enters the head. The designed channels described below then ensure that the fully formed composite stream is then distributed around the head to form the parison.

SUMMARY OF THE INVENTION

An assembly for forming a parison has at least a mandrel housing and a mandrel. The mandrel housing has an axially aligned hollow mandrel channel therein and a side channel substantially transverse to the mandrel channel. The mandrel has an axially oriented notch in an exterior surface. The notch is in fluid communication with two fluid channels that extend continuously downwardly around the mandrel to meet one another on an opposite side of the mandrel from the notch. Each of the fluid channels has at least one flow restrictor forming a sloped transition from the fluid channels to the exterior surface of the mandrel. When the mandrel is installed within the mandrel channel, a first radial gap and a second radial gap, both between the mandrel and the mandrel housing, are formed. The first radial gap is less than the second radial gap. The first radial gap being on the side of the notch and the second gap being opposite the notch.

BRIEF DESCRIPTION OF THE DRAWINGS

FIG. 1 is a schematic perspective view of an assembly of components for forming a parison;

FIG. 2 is another schematic perspective view of the assembly of FIG. 1 from another angle;

DETAILED DESCRIPTION OF THE PREFERRED EMBODIMENTS

It is to be understood that the device described herein may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Referring now to FIGS. 1 and 2, melt pipes 10 are shown connected to a feed block 12. FIGS. 1 and 2 depict three melt pipes 10, arranged in a substantially horizontal plane, that are connected to the feed block 12 at one end. The opposite end of each melt pipe 10 is connected to an extruder (not shown in FIGS. 1 and 2).

Figure 3:
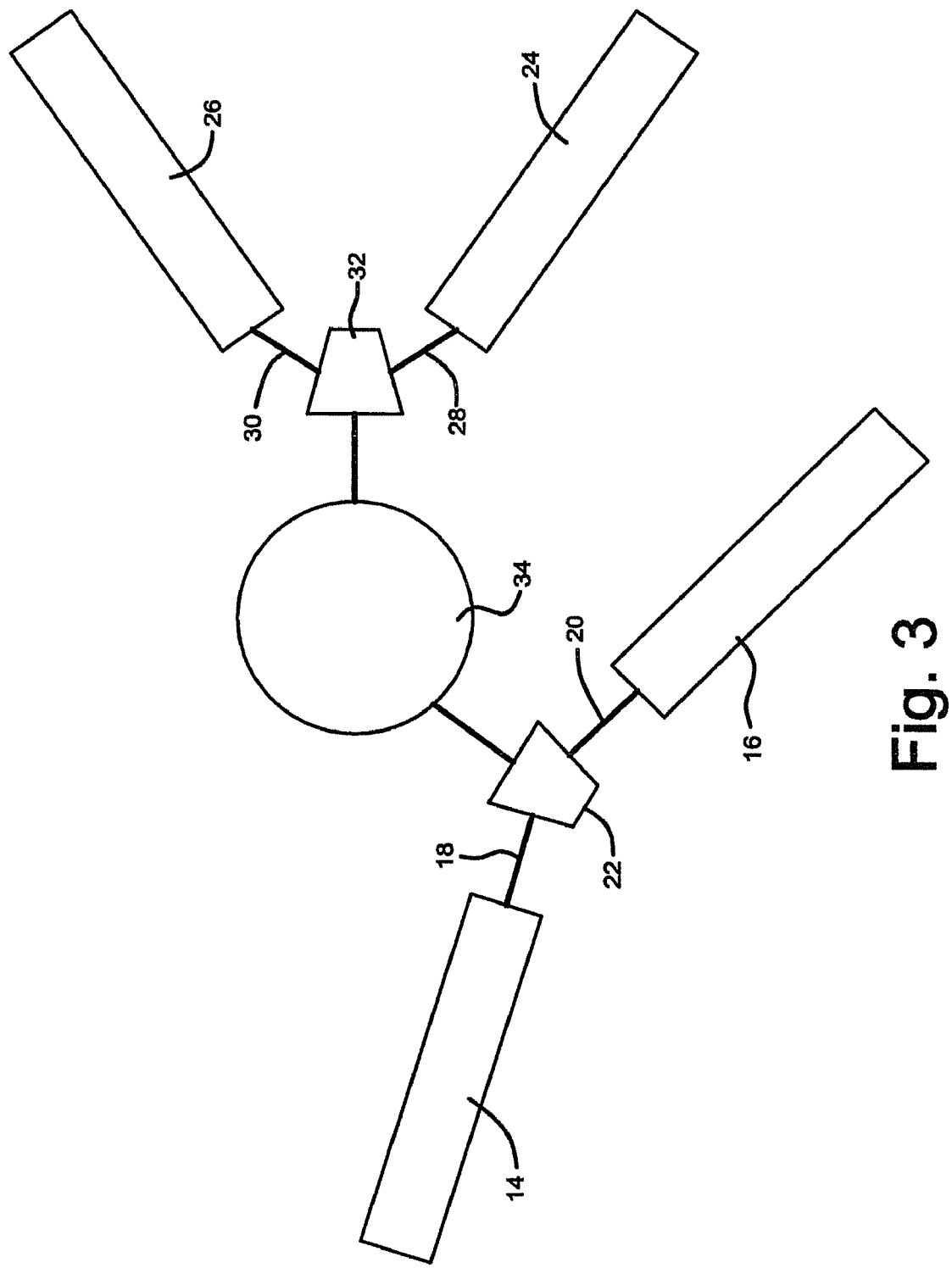
FIG. 3 is a schematic plan view of an alternative arrangement of extruders and feed adaptors.

Additional extruders as well as feed adaptors are permissible. For example, FIG. 3 schematically depicts a first and a second extruder 14, 16 connected by first and second melt pipes 18, 20, respectively, to a first feed block 22. A third and a fourth extruder 24, 26 are connected by third and fourth melt pipes 28, 30, respectively, to a second feed block 32. The feed blocks are connected to an accumulator head 34, or mandrel housing, described in more detail below.

Figure 4:
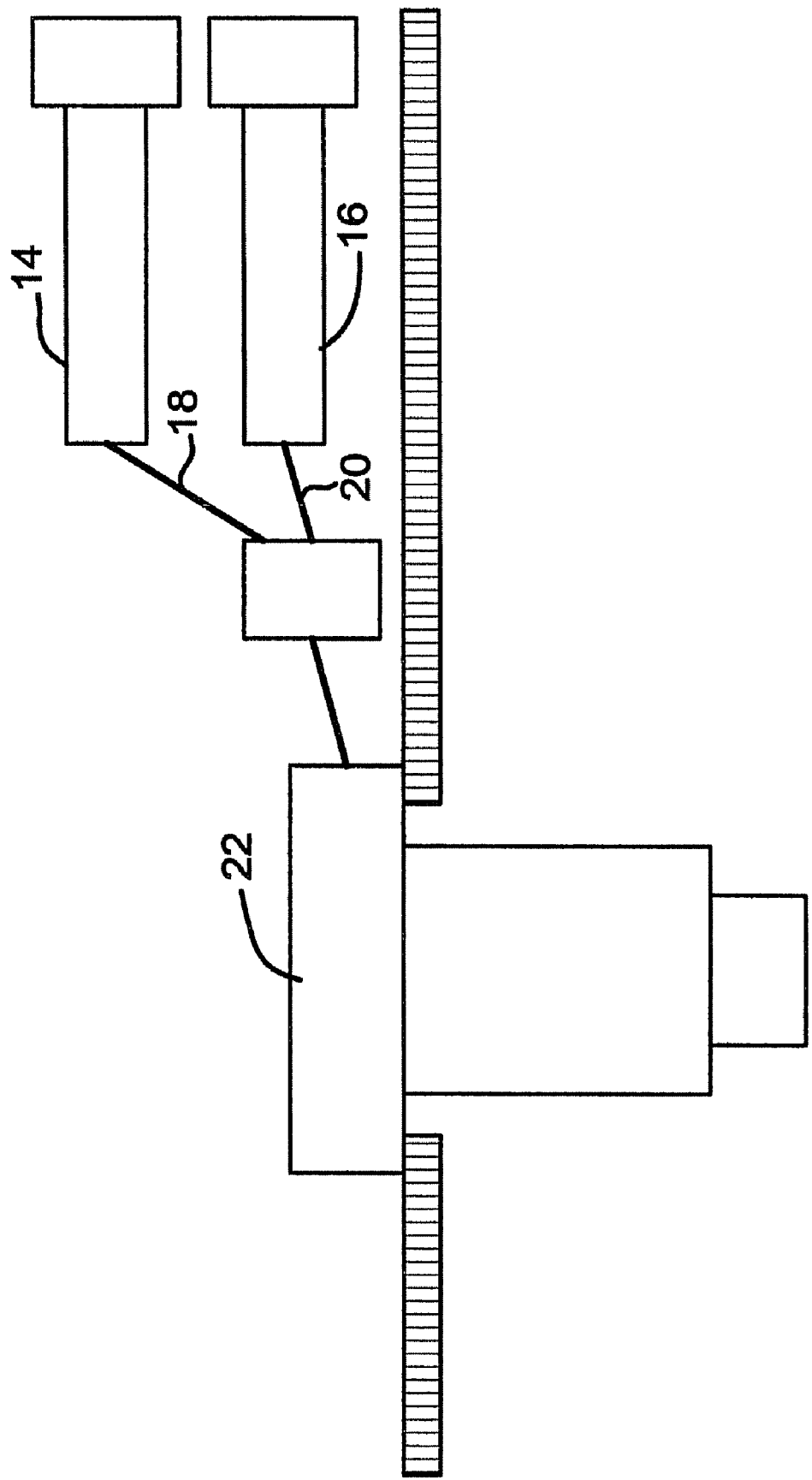
FIG. 4 is a schematic side view of a portion of FIG. 3.

FIG. 4 depicts a portion of FIG. 3 in that only the first and second extruders 14, 16 and the first and second melt pipes 18, 20 are depicted feeding the feed first block 22. FIG. 4 demonstrates that the extruders, as well as the melt pipes, need not be in the same substantially horizontal plane.

As known by those skilled in the art, polymeric melt streams from the extruder flow through the melt pipes to the feed block. Referring now back to FIGS. 1 and 2, the feed block 12 assembles the melt streams from each melt pipe 10 into a composite stream. Feed blocks 12 and methods of assembly, such as depicted and described in U.S. Pat. Nos. 3,557,265 and 3,884,606, whose disclosures are incorporated by reference, can be used. The feed block 12 can be heated by heater lines 36, as shown in FIGS. 1 and 2.

The melt streams can be diverse. By diverse it is meant one stream can comprise a matrix material, another stream can comprise an adhesive, another stream can be a compatibilizer and another stream can be a functional polymeric material. While exemplary streams are discussed above, the present invention is not limited to these types of streams. The resulting composite stream can consist of anywhere from 2 layers and 2 different materials up to 100 layers and 10 dissimilar materials.

The composite stream is preferably comprised of primarily a thermoplastic material, which makes up the majority percentage of the final composite stream. The simplest structure is one material and two layers. The two layers are obviously compatible since they are the same material but the two layers are differentiated by color or regrind content or similar difference. In the case of two layers and two materials the materials must be compatible in order to stick to each other, e.g. they must be from the same polymeric family. An example may be such as a layer of HDPE and a layer of LDPE. The materials are compatible hence they do not require an adhesive or compatibilizing layer.

When combining two dissimilar polymers, an adhesive or compatibilizer is required, necessitating the use of a third layer. A compatibilizer is a thermoplastic that ties two other thermoplastics together by a reactive (covalent or dipole-dipole) bond or a non-reactive means (chain entanglement) means.

All materials from the family of polyolefins suitable for a defined blow molding operation can be used in this invention. The polyolefins category may comprise polyethylene and polypropylene.

The present method and apparatus can also be used with barrier resins. A barrier resin is a thermoplastic material that has a low gas and/or water vapor transmission rate and a high barrier to odorants and essential flavorant oils.

As an example, one embodiment may comprise a five layer structure

| Location in the final product | Material | Percentage |
| --- | --- | --- |
| Outside Layer | HDPE | 20-69% |
| Compatibilizer | Mitsui Admer | 1.5% |
| Barrier Layer | EVOH | 3% |
| Compatibilizer | Mitsui Admer | 1.5% |
| Inside Layer | HDPE | Minimum 25% |

Another example may comprise the following structure:

| Location in the final product | Material | Percentage |
| --- | --- | --- |
| Outside Layer | HDPE | 20-69% |
| Regrind | Regrind | 30%-60% |
| Compatibilizer | Mitsui Admer | 1.5% |
| Barrier Layer | EVOH | 3% |
| Compatibilizer | Mitsui Admer | 1.5% |
| Inside Layer | HDPE | Minimum 25% |

Another example comprises the following structure:

| Location in the final product | Material |
| --- | --- |
| Matrix Polymer Layer | HDPE |
| Compatibilizer | Mitsui Admer |
| Barrier Layer | EVOH |
| Compatibilizer | Mitsui Admer |
| Matrix Polymer Layer | HDPE |
| Compatibilizer | Mitsui Admer |
| Barrier Layer | EVOH |
| Compatibilizer | Mitsui Admer |
| Matrix Polymer Layer | HDPE |
| Compatibilizer | Mitsui Admer |
| Barrier Layer | EVOH |
| Compatibilizer | Mitsui Admer |
| Matrix Polymer Layer | HDPE |
| Compatibilizer | Mitsui Admer |
| Barrier Layer | EVOH |
| Compatibilizer | Mitsui Admer |
| Matrix Polymer Layer | HDPE |

With continued reference to FIGS. 1 and 2, the feed block 12 is attached to a transfer pipe 38 which compresses and shapes the composite stream. The transfer pipe 38 has a substantially polygonal entrance that is relatively thin and wide. The entrance leads to a substantially polygonal channel that gradually tapers down to an exit that has a shape that is slightly taller and thicker than the entrance. Heat, through a heater line 36, may be added to the transfer pipe 38.

Optionally, an interfacial surface generator, such as the devices described in U.S. Pat. Nos. 5,202,074, 5,380,479, 5,540,878 and 5,628,950, which are incorporated by reference, may be located anywhere after the feed block 12 but preferably before the entrance of the mandrel housing (described in more detail below). The generator acts as a layer multiplier, as know by those skilled in the art.

Attached to the outlet of the transfer pipe 38 is a flow insert 40, as seen in FIGS. 1 and 2. The flow insert 40 has a tube 42 with a substantially circular exterior 44 and a hollow interior in the shape of a substantially polygonal channel 46. The tube 42 terminates in a concave end wall 48. The composite stream flows through the substantially polygonal channel 46.

Figure 5:
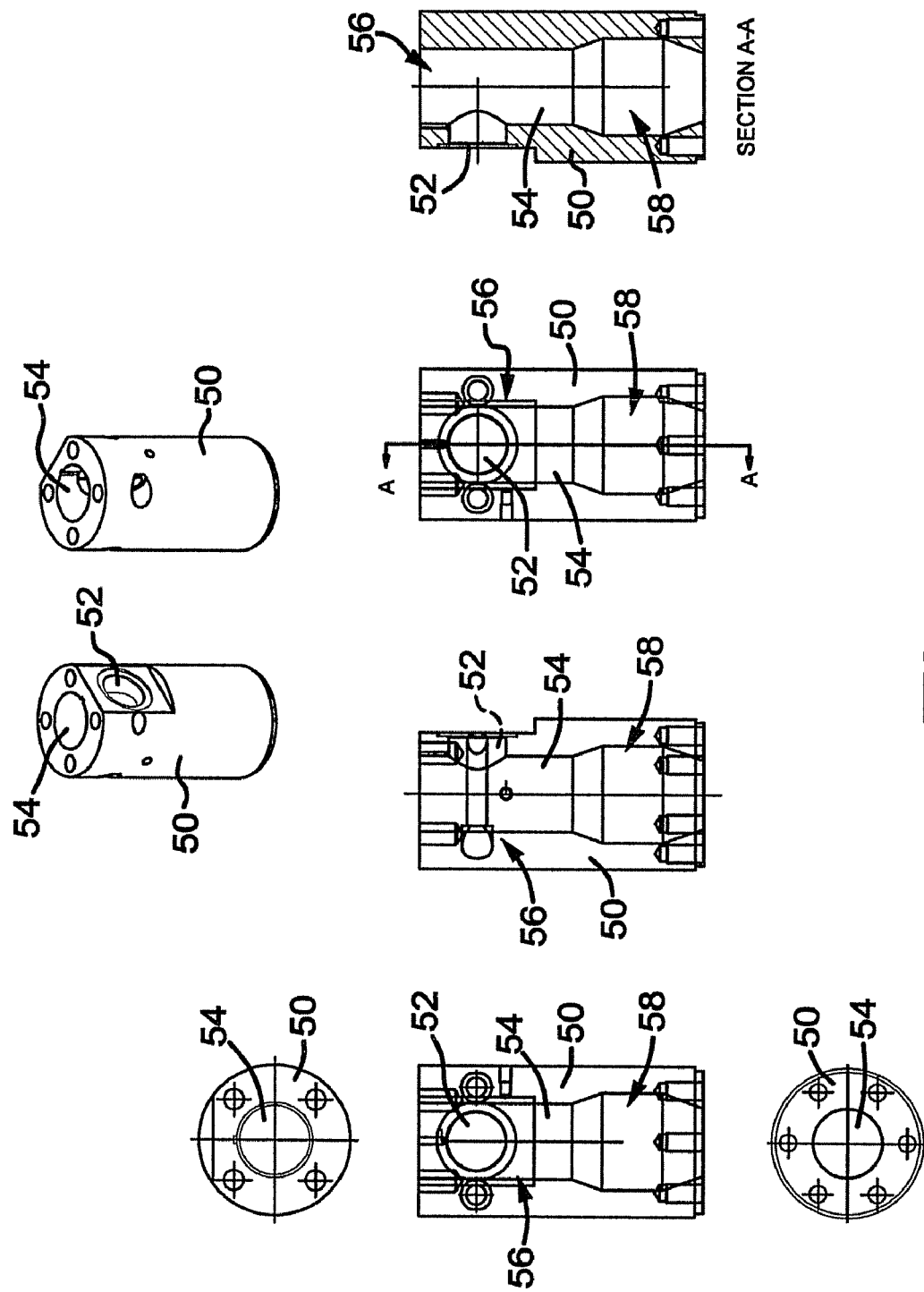
FIG. 5 depicts various perspective, top, side, bottom and internal views of a component of FIG. 1.

The flow insert 40 is attached to a mandrel housing 50 which is best seen in FIG. 5. The mandrel housing 50 has a side channel 52 for receiving the tube 42 from the flow insert 40. The side channel 52 is substantially circular to accommodate the tube 42. The side channel 52 extends substantially horizontally into a mandrel channel 54 within the mandrel housing 50. The mandrel channel 54 extends substantially transverse to the side channel 52.

The mandrel channel 54 has an upper portion 56 and a lower portion 58. The upper portion 56 has a substantially constant inner diameter. The lower portion 58 may have any number of sections.

Figure 6:
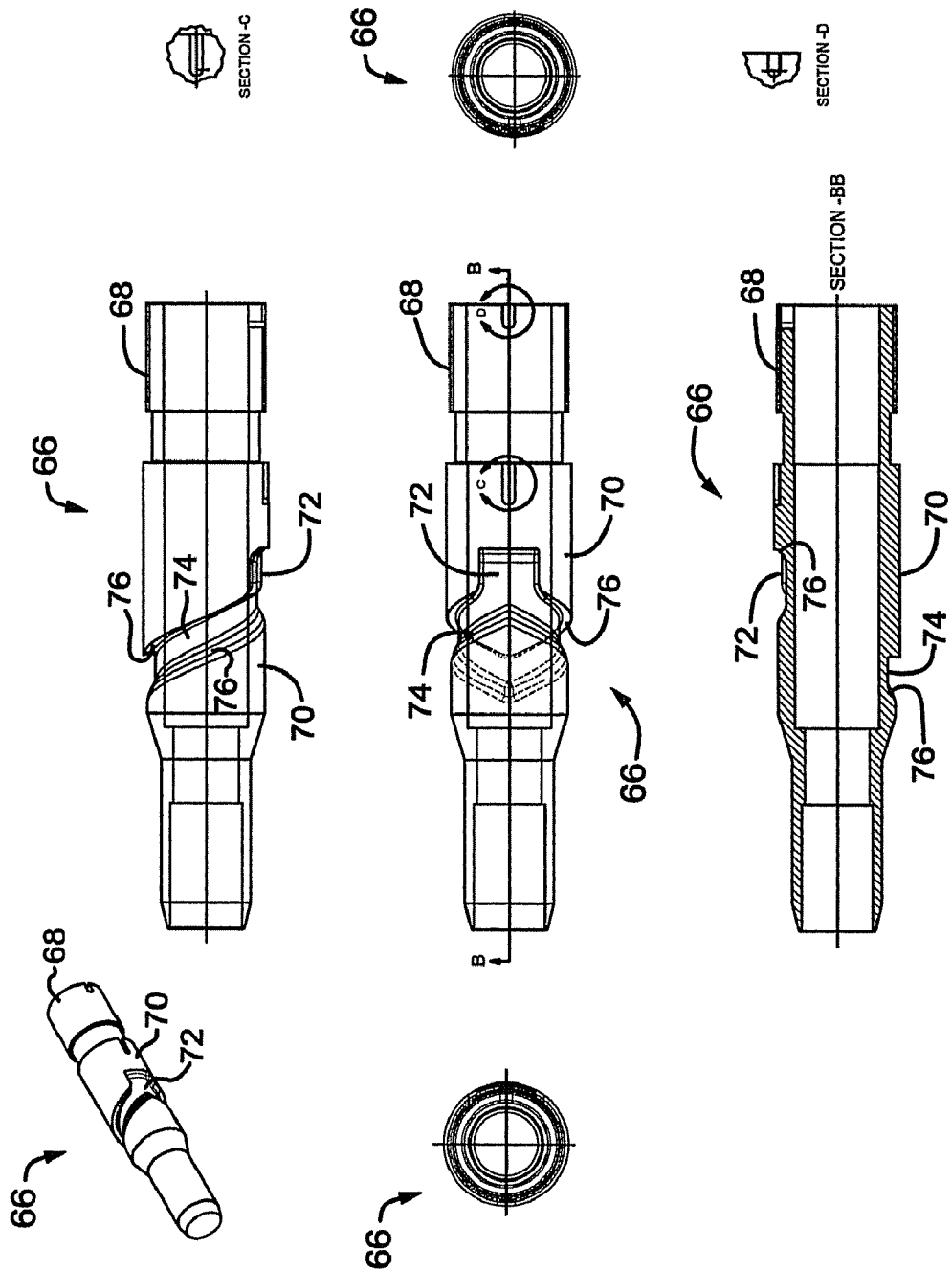
FIG. 6 depicts various perspective, top, side, bottom and internal views of another component of FIG. 1.

A tubular mandrel 66, such as depicted in FIG. 6, is located within the mandrel housing 50. The mandrel 66 has a first portion 68 with a plurality of threads. The threads can be engaged with a system for blowing air through the mandrel 66, as known by those skilled in the art.

Beneath the first portion 68, a substantially cylindrical second portion 70 is provided. A notch 72, having a complementary shape to the tube 42 of the flow insert 40, is provided in the second portion 70. Two channels 74 in the mandrel 66 connect to the notch 72. The channels 74 extend downwardly and around the mandrel 66 until they meet approximately 180 degrees from the notch 72. The channels 74 are defined by flow restrictors 76. The flow restrictors 76 preferably have a sloped surface.

Connected below the second portion 70 may be any number of sections having any number of shapes.

While the figures depict the tube 42 of the flow insert 40 being substantially perpendicular to the mandrel channel 54, other orientations are possible. For example, the flow insert 40 can be at almost any angle with respect to the mandrel channel 54.

Figure 7:
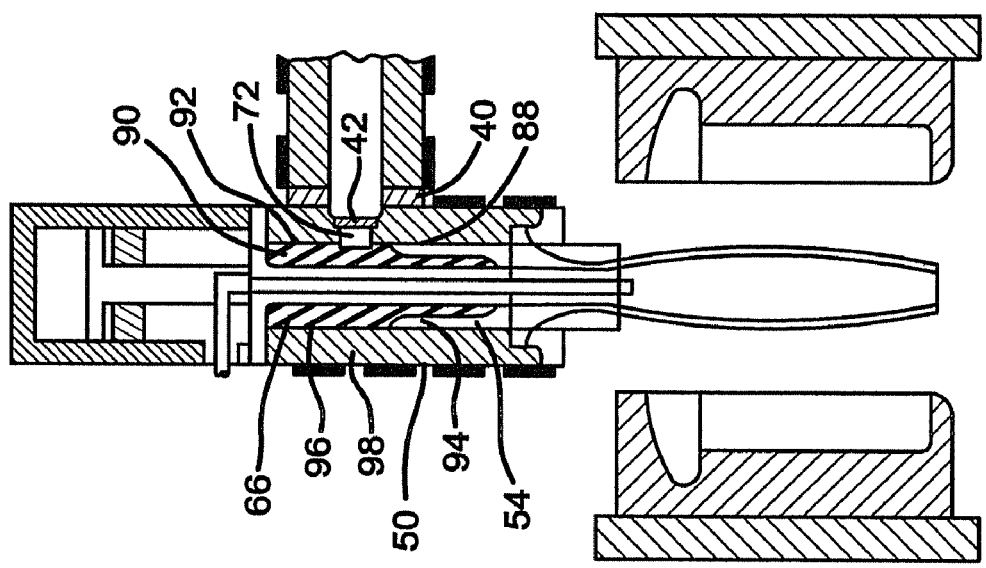
FIG. 7 depicts a schematic, cut-away side view of an assembly of certain components of the present invention.

As shown in FIG. 7, when the mandrel 66 is located within the mandrel channel 54, the notch 72 of the mandrel 66 is aligned with the tube 42 of flow insert 40. Additionally, when the mandrel 66 is located in the mandrel channel 54, a first gap 88, located between a first portion 90 of the mandrel 66 and a first portion 92 of the housing 50, is less than a second gap 94, located between a second portion 96 of the mandrel 66 and a second portion 98 of the housing 50. The first gap 88 is preferably on the same side as the notch 72 in the mandrel 66. The second gap 94 of is preferably located approximately 180 degrees from the notch 72. The circumferential gap between the mandrel 66 and the mandrel channel 54 is a smooth transition from the minimum at the first gap 88 to the maximum at the second gap 94.

The composite stream flows through the insert 40 into the side channel 52 of the mandrel housing 52. The composite stream flows into the notch 72 of the mandrel 66. The notch 72 re-directs the composite stream approximately 90 degrees from its original direction. The composite stream then begins to follow the channels 74 downwardly along the mandrel 66. The sloped surfaces of the flow restrictors 76, as well as a pressure gradient (described below), assist in maintaining the integrity of the layered nature of the composite stream fully around the mandrel 66.

The pressure gradient results from the composite stream entering the mandrel channel 54 and encountering the flow restrictors 76, as well as the first gap 88 and the second gap 94. The smaller clearance of the first gap 88 results in a localized high pressure area in the first gap 88. The larger clearance of the second gap 94 results in a lower pressure in the second gap 94, as compared to the pressure in gap 88. The higher pressure in the first gap 88 urges the composite stream to flow toward the lower pressure in the second gap 94. The pressure gradient achieved is a function of many factors including, but not limited to, the make-up of the composite stream, the viscosity of the material, the input and output rate of the composite stream into and out of the mandrel housing and/or the temperature of the composite stream.

The composite stream then preferentially fills the space above (upstream of) the first gap 88. The composite stream then flows downwardly producing an annular tube called a parison, as known by those skilled in the art. The parison is formed with the distinct layers of the composite stream still substantially intact. The parison can then be molded into a useful article such as a container. The container can be of any configuration achievable with known blow molding technology.

It is within the scope of the present invention to use the above-described method and apparatus with typical secondary operations for the blow molding process such as parison programming, blowing through a blow pin and blowing through a needle. As known by those skilled in the art, blow pin technology allows the blow air to enter the parison from the top or bottom between the mold halves and blow needle technology allows the blow air to enter the parison by puncturing the parison from the side.

The methods and apparatus described herein can also be applied to other plastics processes such as sheet extrusion and thermoforming, compression molding, blown film extrusion and injection molding.

Blow molding is mentioned above. Blow molding can be defined as the extrusion of a substantially circular parison of melted material followed by the capture of the parison between two cooled mold halves and the subsequent blowing, with air or other gas, of the plastic parison within the mold, forming the final part. Within the category of blow molding there are a number of commercially available machines that are characterized by the method used to extrude the parison. These different blow molding machines form sub-categories such as continuous extrusion, reciprocating screw extrusion, accumulator head, injection blow and stretch blow.

As known by those skilled in the art, continuous extrusion can be characterized by the continuous extrusion of the parison. Reciprocating screw extrusion can be characterized by the extrusion of a polymer into a chamber inside the extruder. The melted polymer is then injected into the blow mold head. Accumulator head can be characterized by the extrusion of a polymer into a chamber inside the blow mold head. The melted polymer is then injected into the parison by means of an annular ram pushing down. Injection blow can be characterized by the extrusion of a polymer into a chamber inside the extruder. The melted polymer is then injected into a cavity making a "pre-form" which is then quickly transferred to another station and blown into a useful part. Stretch blow can be characterized by the injection of a pre-form. The pre-form is then re-heated and then blown into a useful part.

Figure 8:
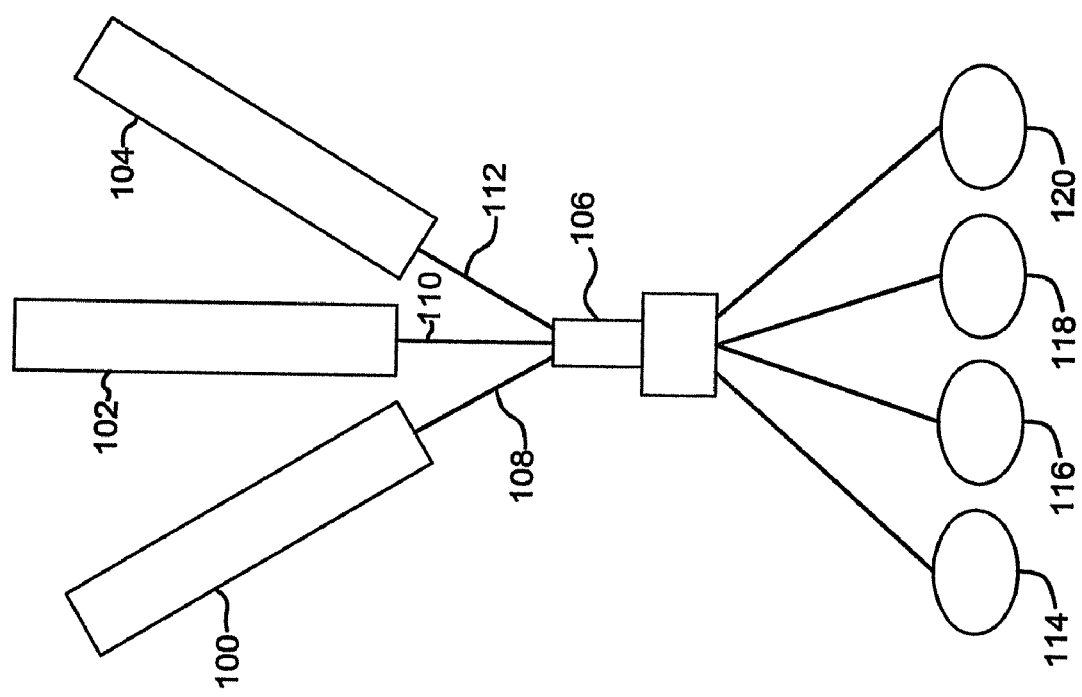
FIG. 8 depicts a schematic plan view of an alternative arrangement of extruders, feed blocks, melt pipes and extrusion heads.

The method and apparatus described above can also comprise the device depicted in FIG. 8. FIG. 8 depicts multiple extruders 100, 102, 104 connected to a feed block 106 with multiple melt pipes 108, 110, 112. The melt pipes all feed into a single mold or feed block. The mold block may be connected to multiple extrusion heads 114, 116, 118, 120, each of which function as the single extrusion head described above.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. An assembly for forming a parison, comprising:
    a mandrel housing having an axially aligned hollow mandrel channel therein and a side channel substantially transverse to said mandrel channel; and
    a mandrel having a single axially oriented notch in an exterior surface, said notch in fluid communication with two fluid channels that each extend at an angle from said notch continuously downwardly around said mandrel to meet one another on an opposite side of the mandrel from said notch, wherein each of said fluid channels has two flow restrictors bordering each channel, each restrictor forming a sloped transition from said fluid channels to said exterior surface of said mandrel from said notch to the opposite side of said notch where the channels meet;
    wherein when said mandrel is installed within said mandrel channel, a first radial gap and a second radial gap, both between the mandrel and the mandrel housing, are formed, wherein said first radial gap is less than said second radial gap, said first radial gap being substantially only on the side of the notch of the mandrel and said second gap being substantially only opposite said notch.

* * * * *